(12) United States Patent
Park et al.

(10) Patent No.: US 8,743,988 B2
(45) Date of Patent: Jun. 3, 2014

(54) TRANSMISSION MODE ADAPTATION IN A WIRELESS NETWORK

(75) Inventors: Chester Park, Santa Clara, CA (US);
Yi-Pin Eric Wang, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 479 days.

(21) Appl. No.: 13/194,772

(22) Filed: Jul. 29, 2011

(65) Prior Publication Data

US 2013/0028309 A1 Jan. 31, 2013

(51) Int. Cl.
*H04B 7/04* (2006.01)
*H04L 1/20* (2006.01)

(52) U.S. Cl.
USPC .......................................... 375/267; 375/316

(58) Field of Classification Search
CPC .. H04B 7/0417; H04B 7/0413; H04B 7/0452;
H04B 7/0456; H04B 7/046; H04B 7/0465;
H04B 7/0473; H04B 7/0478; H04B 7/0486;
H04L 1/0015; H04L 1/20; H04L 1/0003;
H04L 1/0009; H04L 1/0014; H04L 1/0025;
H04L 1/0618; H04L 1/0631; H04L 25/03929
USPC .................. 375/259, 267, 285, 316, 347, 227
See application file for complete search history.

(56) References Cited

U.S. PATENT DOCUMENTS

| | | | |
|---|---|---|---|
| 7,116,981 B2 | 10/2006 | Jeon et al. | |
| 7,197,084 B2 | 3/2007 | Ketchum et al. | |
| 7,428,269 B2 | 9/2008 | Sampath et al. | |
| 7,567,621 B2 | 7/2009 | Sampath et al. | |
| 7,729,442 B2 | 6/2010 | Kim et al. | |
| 7,817,739 B2 | 10/2010 | Wennström et al. | |
| 7,826,489 B2 | 11/2010 | Buidanu et al. | |
| 7,885,228 B2 | 2/2011 | Walton et al. | |
| 2005/0099975 A1* | 5/2005 | Catreux et al. | 370/329 |
| 2006/0133521 A1 | 6/2006 | Sampath et al. | |
| 2006/0256848 A1* | 11/2006 | Medvedev et al. | 375/227 |
| 2006/0285605 A1 | 12/2006 | Walton et al. | |
| 2007/0165738 A1 | 7/2007 | Barriac et al. | |
| 2007/0183529 A1* | 8/2007 | Tujkovic et al. | 375/267 |

(Continued)

FOREIGN PATENT DOCUMENTS

| | | |
|---|---|---|
| CN | 101232356 A | 7/2008 |
| EP | 2 073 471 A1 | 6/2009 |
| WO | 2006/138622 A2 | 12/2006 |
| WO | 2008/066468 A2 | 6/2008 |
| WO | 2013/017997 A1 | 2/2013 |

OTHER PUBLICATIONS

Mai Vu et al., "Linear Precoding for MIMO Channels with Non-zero Mean and Transmit Correlation in Orthogonal Space-Time Coded Systems", Information Systems Laboratory, Department of Electrical Engineering Stanford University, Stanford, CA, Sep. 29, 2004, 5 pages (2503-2507).

(Continued)

*Primary Examiner* — Betsy Deppe
(74) *Attorney, Agent, or Firm* — Nixon & Vanderhye, P.C.

(57) ABSTRACT

Conventional mode adaptation does not account for the gain imbalance between channels for measurement and for data reception. Therefore, the precoder, which is selected based on the measurement channel, may not be the optimal precoder for the data reception channel. By maintaining relative SINR ordering between transmission modes, a receiver may select the transmission mode for a transmitter that maximizes the actual throughput even in the presence of inter-antenna gain increase or decrease.

27 Claims, 10 Drawing Sheets

(56) References Cited

U.S. PATENT DOCUMENTS

| | | |
|---|---|---|
| 2007/0223423 A1 | 9/2007 | Kim et al. |
| 2008/0159425 A1 | 7/2008 | Khojastepour et al. |
| 2008/0188190 A1* | 8/2008 | Prasad et al. ............... 455/114.3 |
| 2008/0188259 A1 | 8/2008 | Blanz et al. |
| 2008/0192849 A1 | 8/2008 | Kim et al. |
| 2009/0202014 A1 | 8/2009 | Mujtaba et al. |
| 2009/0203335 A1 | 8/2009 | Lee et al. |
| 2009/0238086 A1* | 9/2009 | Ringstrom et al. ........... 370/252 |
| 2010/0002598 A1 | 1/2010 | Pan et al. |
| 2010/0061473 A1 | 3/2010 | Choi et al. |
| 2010/0238882 A1 | 9/2010 | Zhang et al. |
| 2010/0284359 A1 | 11/2010 | Kim et al. |
| 2010/0329217 A1 | 12/2010 | Lindoff et al. |
| 2011/0019715 A1 | 1/2011 | Brisebois |

OTHER PUBLICATIONS

Byungwook Yoo et al., "A simple linear precoder for selection-type cooperative MIMO systems", IEEE Communications Letters, vol. 14, No. 4, Apr. 2010, & Abstract, 4 pages total (pp. 306-308).

3GPP TSG RAN WG1 61, R1-102828, "Specifying Basic Building Blocks of UL Multi-Antenna Transmission", Texas Instruments, Montreal, Canada, May 10-14, 2010, 8 pages (1-8).

3GPP TS 36.211 V10.0.0, "3rd Generation Partnership Project; Technical Specification Group Radio Access Network; Evolved Universal Terrestrial Radio Access (E-UTRA); Physical channels and modulation (Release 10)", Dec. 2010, 103 pages (1-103).

International Search Report and Written Opinion mailed Nov. 29, 2012 in International Application No. PCT/IB2012/053806 (11 pages total).

* cited by examiner

TRANSMISSION MODE ADAPTATION IN A WIRELESS NETWORK

TECHNICAL FIELD

Technical field of present disclosure relates to transmission mode adaptation in a node of a wireless network. In particular, the field is related to selecting a transmission mode among a plurality of transmission modes for the node of the wireless network in the presence of gain variation.

BACKGROUND AND SUMMARY

Currently, MIMO (multiple-input-multiple-output) is considered to be a key element of the air interface for high-speed wireless communications. MIMO can provide both diversity gain and multiplexing gain. MIMO enables simultaneous transmission of multiple streams, each stream being referred to as a layer. The number of transmit antennas, receive antennas, and layers are denoted by $N_T$, $N_R$, and R, respectively. The number of layers R is never greater than the number of transmit antennas $N_T$, and is often smaller than or equal to the number of receive antennas $N_R$.

Generally, MIMO assumes the use of a precoder, which is mathematically expressed as a left-multiplication of a layer signal vector (R×1) by a precoding matrix ($N_T$×R). The precoding matrix is chosen from a pre-defined set of matrices, a so-called codebook as exemplified in Tables 1 and 2 for two and four transmit antennas, respectively. The r-th column vector of the precoding matrix represents the antenna spreading weight of the r-th layer.

TABLE 1

Codebook for LTE UL (2-TX)

| Precoder Matrix Index | Number of layers v | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | — |
| 2 | $\frac{1}{\sqrt{2}}\begin{bmatrix}1\\j\end{bmatrix}$ | — |
| 3 | $\frac{1}{\sqrt{2}}\begin{bmatrix}1\\-j\end{bmatrix}$ | — |
| 4 | $\frac{1}{\sqrt{2}}\begin{bmatrix}1\\0\end{bmatrix}$ | — |
| 5 | $\frac{1}{\sqrt{2}}\begin{bmatrix}0\\1\end{bmatrix}$ | — |

TABLE 2

Codebook for LTE UL (4-TX)

| Precoder Matrix Index | Number of layers v | | | |
|---|---|---|---|---|
| | 1 | 2 | 3 | 4 |
| 0 | $\frac{1}{2}\begin{bmatrix}1\\1\\1\\-1\end{bmatrix}$ | $\frac{1}{2}\begin{bmatrix}1 & 0\\1 & 0\\0 & 1\\0 & -j\end{bmatrix}$ | $\frac{1}{2}\begin{bmatrix}1 & 0 & 0\\1 & 0 & 0\\0 & 1 & 0\\0 & 0 & 1\end{bmatrix}$ | $\frac{1}{2}\begin{bmatrix}1 & 0 & 0 & 0\\0 & 1 & 0 & 0\\0 & 0 & 1 & 0\\0 & 0 & 0 & 1\end{bmatrix}$ |
| 1 | $\frac{1}{2}\begin{bmatrix}1\\1\\j\\j\end{bmatrix}$ | $\frac{1}{2}\begin{bmatrix}1 & 0\\1 & 0\\0 & 1\\0 & j\end{bmatrix}$ | $\frac{1}{2}\begin{bmatrix}1 & 0 & 0\\-1 & 0 & 0\\0 & 1 & 0\\0 & 0 & 1\end{bmatrix}$ | — |
| 2 | $\frac{1}{2}\begin{bmatrix}1\\1\\-1\\1\end{bmatrix}$ | $\frac{1}{2}\begin{bmatrix}1 & 0\\-j & 0\\0 & 1\\0 & 1\end{bmatrix}$ | $\frac{1}{2}\begin{bmatrix}1 & 0 & 0\\0 & 1 & 0\\1 & 0 & 0\\0 & 0 & 1\end{bmatrix}$ | — |
| 3 | $\frac{1}{2}\begin{bmatrix}1\\1\\-j\\-j\end{bmatrix}$ | $\frac{1}{2}\begin{bmatrix}1 & 0\\-j & 0\\0 & 1\\0 & -1\end{bmatrix}$ | $\frac{1}{2}\begin{bmatrix}1 & 0 & 0\\0 & 1 & 0\\-1 & 0 & 0\\0 & 0 & 1\end{bmatrix}$ | — |
| 4 | $\frac{1}{2}\begin{bmatrix}1\\j\\1\\j\end{bmatrix}$ | $\frac{1}{2}\begin{bmatrix}1 & 0\\-1 & 0\\0 & 1\\0 & -j\end{bmatrix}$ | $\frac{1}{2}\begin{bmatrix}1 & 0 & 0\\0 & 1 & 0\\0 & 0 & 1\\1 & 0 & 0\end{bmatrix}$ | — |
| 5 | $\frac{1}{2}\begin{bmatrix}1\\j\\j\\1\end{bmatrix}$ | $\frac{1}{2}\begin{bmatrix}1 & 0\\-1 & 0\\0 & 1\\0 & j\end{bmatrix}$ | $\frac{1}{2}\begin{bmatrix}1 & 0 & 0\\0 & 1 & 0\\0 & 0 & 1\\-1 & 0 & 0\end{bmatrix}$ | — |
| 6 | $\frac{1}{2}\begin{bmatrix}1\\j\\-1\\-j\end{bmatrix}$ | $\frac{1}{2}\begin{bmatrix}1 & 0\\j & 0\\0 & 1\\0 & 1\end{bmatrix}$ | $\frac{1}{2}\begin{bmatrix}0 & 1 & 0\\1 & 0 & 0\\1 & 0 & 0\\0 & 0 & 1\end{bmatrix}$ | — |
| 7 | $\frac{1}{2}\begin{bmatrix}1\\j\\-j\\-1\end{bmatrix}$ | $\frac{1}{2}\begin{bmatrix}1 & 0\\j & 0\\0 & 1\\0 & -1\end{bmatrix}$ | $\frac{1}{2}\begin{bmatrix}0 & 1 & 0\\1 & 0 & 0\\-1 & 0 & 0\\0 & 0 & 1\end{bmatrix}$ | — |
| 8 | $\frac{1}{2}\begin{bmatrix}1\\-1\\1\\1\end{bmatrix}$ | $\frac{1}{2}\begin{bmatrix}1 & 0\\0 & 1\\1 & 0\\0 & 1\end{bmatrix}$ | $\frac{1}{2}\begin{bmatrix}0 & 1 & 0\\1 & 0 & 0\\0 & 0 & 1\\1 & 0 & 0\end{bmatrix}$ | — |
| 9 | $\frac{1}{2}\begin{bmatrix}1\\-1\\j\\-j\end{bmatrix}$ | $\frac{1}{2}\begin{bmatrix}1 & 0\\0 & 1\\1 & 0\\0 & -1\end{bmatrix}$ | $\frac{1}{2}\begin{bmatrix}0 & 1 & 0\\1 & 0 & 0\\0 & 0 & 1\\-1 & 0 & 0\end{bmatrix}$ | — |
| 10 | $\frac{1}{2}\begin{bmatrix}1\\-1\\-1\\-1\end{bmatrix}$ | $\frac{1}{2}\begin{bmatrix}1 & 0\\0 & 1\\-1 & 0\\0 & 1\end{bmatrix}$ | $\frac{1}{2}\begin{bmatrix}0 & 1 & 0\\0 & 0 & 1\\1 & 0 & 0\\1 & 0 & 0\end{bmatrix}$ | — |

TABLE 2-continued

Codebook for LTE UL (4-TX)

| Precoder Matrix Index | Number of layers ν | | | |
|---|---|---|---|---|
| | 1 | 2 | 3 | 4 |
| 11 | $\frac{1}{2}\begin{bmatrix} 1 \\ -1 \\ -j \\ j \end{bmatrix}$ | $\frac{1}{2}\begin{bmatrix} 1 & 0 \\ 0 & 1 \\ -1 & 0 \\ 0 & -1 \end{bmatrix}$ | $\frac{1}{2}\begin{bmatrix} 0 & 1 & 0 \\ 0 & 0 & 1 \\ 1 & 0 & 0 \\ -1 & 0 & 0 \end{bmatrix}$ | — |
| 12 | $\frac{1}{2}\begin{bmatrix} 1 \\ -j \\ 1 \\ -j \end{bmatrix}$ | $\frac{1}{2}\begin{bmatrix} 1 & 0 \\ 0 & 1 \\ 0 & 1 \\ 1 & 0 \end{bmatrix}$ | — | — |
| 13 | $\frac{1}{2}\begin{bmatrix} 1 \\ -j \\ j \\ -1 \end{bmatrix}$ | $\frac{1}{2}\begin{bmatrix} 1 & 0 \\ 0 & 1 \\ 0 & -1 \\ 1 & 0 \end{bmatrix}$ | — | — |
| 14 | $\frac{1}{2}\begin{bmatrix} 1 \\ -j \\ -1 \\ j \end{bmatrix}$ | $\frac{1}{2}\begin{bmatrix} 1 & 0 \\ 0 & 1 \\ 0 & 1 \\ -1 & 0 \end{bmatrix}$ | — | — |
| 15 | $\frac{1}{2}\begin{bmatrix} 1 \\ -j \\ -j \\ 1 \end{bmatrix}$ | $\frac{1}{2}\begin{bmatrix} 1 & 0 \\ 0 & 1 \\ 0 & -1 \\ -1 & 0 \end{bmatrix}$ | — | — |
| 16 | $\frac{1}{2}\begin{bmatrix} 1 \\ 0 \\ 1 \\ 0 \end{bmatrix}$ | — | — | — |
| 17 | $\frac{1}{2}\begin{bmatrix} 1 \\ 0 \\ -1 \\ 0 \end{bmatrix}$ | — | — | — |
| 18 | $\frac{1}{2}\begin{bmatrix} 1 \\ 0 \\ j \\ 0 \end{bmatrix}$ | — | — | — |
| 19 | $\frac{1}{2}\begin{bmatrix} 1 \\ 0 \\ -j \\ 0 \end{bmatrix}$ | — | — | — |
| 20 | $\frac{1}{2}\begin{bmatrix} 0 \\ 1 \\ 0 \\ 1 \end{bmatrix}$ | — | — | — |
| 21 | $\frac{1}{2}\begin{bmatrix} 0 \\ 1 \\ 0 \\ -1 \end{bmatrix}$ | — | — | — |
| 22 | $\frac{1}{2}\begin{bmatrix} 0 \\ 1 \\ 0 \\ j \end{bmatrix}$ | — | — | — |
| 23 | $\frac{1}{2}\begin{bmatrix} 0 \\ 1 \\ 0 \\ -j \end{bmatrix}$ | — | — | — |

The precoding matrix usually consists of linearly-independent columns, and thus R is referred to as the rank of codebook. One purpose of a precoder is to match the precoding matrix with the channel so as to increase the received signal power and also to some extent reduce inter-layer interference, thereby improving the signal-to-interference-plus-noise-ratio (SINR) of each layer. Consequently, the precoder selection requires the transmitter to know the channel properties. Generally, the more accurate the channel information, the better the precoder matches.

In 3GPP LTE UL (3$^{rd}$ Generation Partnership Project's Long Term Evolution uplink), the precoder selection, which includes selection of both rank and precoding matrix, for use by the transmitter, e.g. UE (user equipment), is made at the receiver, e.g., eNodeB. Thus, it is not necessary for the receiver to feed channel information back to the transmitter. Instead, it is necessary for the receiver to obtain the channel information so that a proper precoder selection can be made. This can be facilitated by the transmitter transmitting known signals such as DM-RS (demodulation reference signal) and SRS (sounding reference signal) in the case of LTE UL. An example is illustrated in FIG. 1 which illustrates an eNodeB 110, which serves a coverage area (or cell) 120 receiving uplink transmissions from UEs 130. The eNodeB 110 selects one precoder for use by UE 130-1, another precoder for UE 130-2 and yet another precoder for UE 130-3. Each UE 130 can facilitate the precoder selections by transmitting the known signal to the eNodeB 110. Both DM-RS and SRS are defined in the frequency domain and derived from Zadoff-Chu sequence.

It should be noted that DM-RS is precoded while SRS is not. Thus, the channel information obtained from DM-RS is the equivalent channel that the R layers experience, not the physical channel that the $N_T$ antennas experience. Mathematically, letting H denote the $N_R \times N_T$ physical channel matrix, W denote the $N_T \times R$ preceding matrix, and E denote the $N_R \times R$ equivalent channel, it follows that $$E = HDW \tag{1}$$

where D is the $N_T \times N_T$ diagonal matrix whose diagonal elements represent the inter-antenna gain/phase imbalance. Using the above notation, the equivalent channels for PUSCH (physical uplink shared channel), DM-RS and SRS denoted by $E_{PUSCH}$, $E_{DMRS}$ and $E_{SRS}$ can be expressed as $$E_{PUSCH} = HW$$

$$E_{DMRS} = HW$$

$$H_{SRS} = HD \tag{2}$$

Here it is assumed that there is no channel variation among the PUSCH, DM-RS and SRS and D is set to the identity matrix for PUSCH and DM-RS without loss of generality. It is also assumed that PUSCH and DM-RS experience the same channel. Also note that $H_{SRS}$ in (2) is directly obtained from SRS, and based on $H_{SRS}$, the equivalent channel $E_{SRS}$ as a function of a hypothesized precoder, W can be obtained as $E_{SRS}=H_{SRS}W$.

Typically, the precoder is selected based on SRS, since it is more easily done with complete knowledge of channel, i.e., the physical channel, HD in (2). Based on the physical channel estimated based on SRS, the receiver chooses the best precoder and notifies the transmitter. One criteria for selecting the precoder is to maximize the throughput. For example, the effective SINR is calculated for each precoder, i.e., each selection of the rank and precoder matrix, the relevant throughput is calculated, and the precoder maximizing the throughput is selected. But it should be understood that precoder selection is subject to inter-antenna imbalance variation between measurement period and actual data transmission period.

Conventionally, the eNodeB measures the SRS transmitted from the UE. Based on the measurement, the eNodeB calculates the SINR of the SRS for each of the hypothesized precoder considered. A calculated SINR value corresponding to each of the hypothesized precoders is then directly used to select a MCS (modulation and coding scheme). Table 3 is a table that maps the MCSs to the SINRs. In this table, larger transport block sizes correspond to higher throughputs. Also, the MCSs are ordered such that higher MCSs correspond to higher throughputs.

TABLE 3

| MCS | Modulation | Transport Block Size | | Required SINR for 10% BLER |
|---|---|---|---|---|
| | | 6 RB (1.08 MHz) | 25 RB (5 MHz) | |
| 0 | QPSK | 152 | 680 | −6.268 |
| 1 | QPSK | 208 | 904 | −5.105 |
| 2 | QPSK | 256 | 1096 | −4.309 |
| 3 | QPSK | 328 | 1416 | −3.226 |
| 4 | QPSK | 408 | 1800 | −2.177 |
| 5 | QPSK | 504 | 2216 | −1.366 |
| 6 | QPSK | 600 | 2600 | −0.631 |
| 7 | QPSK | 712 | 3112 | 0.431 |
| 8 | QPSK | 808 | 3496 | 1.128 |
| 9 | QPSK | 936 | 4008 | 1.989 |
| 10 | QPSK | 1032 | 4392 | 2.703 |
| 11 | 16-QAM | 1032 | 4392 | 3.342 |
| 12 | 16-QAM | 1192 | 4968 | 3.943 |
| 13 | 16-QAM | 1352 | 5736 | 4.996 |
| 14 | 16-QAM | 1544 | 6456 | 5.862 |
| 15 | 16-QAM | 1736 | 7224 | 6.704 |
| 16 | 16-QAM | 1800 | 7736 | 7.262 |
| 17 | 16-QAM | 1928 | 7992 | 7.529 |
| 18 | 16-QAM | 2152 | 9144 | 8.847 |
| 19 | 16-QAM | 2344 | 9912 | 9.632 |
| 20 | 16-QAM | 2600 | 10680 | 10.453 |
| 21 | 64-QAM | 2600 | 10680 | 11.000 |
| 22 | 64-QAM | 2792 | 11448 | 11.595 |
| 23 | 64-QAM | 2984 | 12576 | 12.713 |
| 24 | 64-QAM | 3240 | 13536 | 13.589 |
| 25 | 64-QAM | 3496 | 14112 | 14.320 |
| 26 | 64-QAM | 3624 | 15264 | 15.089 |
| 27 | 64-QAM | 3752 | 15840 | 15.554 |
| 28 | 64-QAM | 4392 | 18836 | 17.782 |

Note that selection of the MCS determines both the modulation (e.g., FSK, QPSK, QAM) and the throughput. For example, referring to FIG. 1, the SINR corresponding to a hypothesized precoder measured from the SRS transmitted by the UE 130-3 located at the edge of the cell 120 may be relatively low such as −3.5 dB and the SINR corresponding to the same hypothesized precoder measured from the UE 130-1 located closer to eNodeB 110 may be relatively high such as 12 dB. Using the conventional adaptation method, the eNodeB 110 would select MCS 2 for the UE 130-3 and MCS 22 for the UE 130-1. This means that the modulation used by the UEs 130-3 and 130-1 are QPSK and 64-QAM respectively, for the hypothesized precoder. Also if a 1.08 MHz bandwidth system is assumed, the corresponding throughputs would be 0.256 and 2.792 Mbps, respectively, for the hypothesized precoder. Such a MCS selection process is repeated for all other hypothesized precoders and at the end, the precoder that results in the highest throughput is chosen. The process of identifying a precoder that may result in the highest PUSCH throughput is called transmission mode adaptation. The precoder considered in such a process may of various ranks, and as such rank adaptation is also included as an element in transmission mode adaptation.

One problem of conventional transmission mode adaptation is that measurement (SRS for LTE UL) may experience a different power level compared to that of an actual data reception (PUSCH for LTE UL). This occurs because SRS and PUSCH may have different bandwidths and thus have different transmit power levels. As a result, the receiver may end up selecting a precoder that does not maximize the actual PUSCH throughput. This can be seen as the case where D in (2) has a positive real numbers larger or smaller than 1 as its diagonal elements. In the discussions below, examples of SRS having a higher receive power level than PUSCH (thus a higher gain level) will be used. In this case, a gain increase is likely to increase the effective SINR for each precoder and some of the precoders may reach the SINR for the highest MCS. Thus, the precoders that reach the highest MCS may achieve the maximum throughput.

In the absence of any gain increase, it does not matter which precoder is selected among those that reach the maximum throughput as any of these precoders also results in PUSCH to reach the maximum throughput. However, in the presence of gain increase, only one or some precoders may maximize the actual throughput. In the worst case, none of the precoders with the highest MCS may maximize the actual throughput.

Conventional transmission mode adaptation cannot select the precoder that maximizes the actual PUSCH throughput, since it always selects the precoder that maximizes the hypothetical throughput for the measurement. In the conventional transmission mode adaptation, the precoder is selected whose throughput is calculated first or last, depending on the implementation choice, e.g., its order of throughput calculation. The resulting performance tends to be similar to the performance of fixed precoder, i.e., performance without precoder selection, since it always selects a certain precoder, regardless of the actual throughput for PUSCH. This might also be the case, when the measurement experiences gain decrease and some of the precoders reach the lowest MCS and thus the same throughput.

SUMMARY

A non-limiting aspect of the disclosed subject matter is directed to a method for transmission mode adaptation. The method may be performed at or on behave of a receiver of a wireless network. The method comprises measuring a wireless channel based on a signal transmitted from a transmitter; determining one or more SINRs for each transmission mode of a plurality of transmission modes based on the wireless channel measurement; determining an aggregate throughput of each transmission mode based on the SINRs of the transmission mode; determining whether there are multiple candidate transmission modes, each candidate transmission mode having a same determined highest aggregate throughput; and selecting a transmission mode for use by the transmitter among the candidate transmission modes based on the SINRs of the candidate transmission modes when it is determined that there are multiple candidate transmission modes. Each transmission mode specifies a transmission from the transmitter to the receiver of one or more layers via one or more antennas at the transmitter, and specifies a mapping of codewords to layers.

Another non-limiting aspect of the disclosed subject matter is directed to a receiver of a wireless network. The receiver is structured to perform a transmission mode adaption, and comprises a channel measuring unit, a SINR determining unit, a throughput determining unit, and a mode selecting unit. The channel measuring unit is structured to measure a wireless channel based on a signal transmitted from a transmitter; the SINR determining unit is structured to determine one or more SINRs for each transmission mode of a plurality of transmission modes based on the wireless channel measurement; the throughput determining unit is structured to determine an aggregate throughput of each transmission mode based on the SINRs of the transmission mode; and the mode selecting unit structured to determine whether there are multiple candidate transmission modes, each candidate transmission mode having a same determined highest aggregate throughput, and to select a transmission mode for use by the transmitter among the candidate transmission modes based on the SINRs of the candidate transmission modes when it is determined that there are multiple candidate transmission modes. Each transmission mode specifies a transmission from the transmitter to the receiver of one or more layers via one or more antennas at the transmitter, and specifies a mapping of codewords to layers.

Yet another non-limiting aspect of the disclosed subject matter is directed to a non-transitory computer storage medium which has stored therein programming instructions. When a computer executes the programming instructions, the computer executes the above described method to perform transmission mode adaptation. The method comprises measuring a wireless channel based on a signal transmitted from a transmitter; determining one or more SINRs for each transmission mode of a plurality of transmission modes based on the wireless channel measurement; determining an aggregate throughput of each transmission mode based on the SINRs of the transmission mode; determining whether there are multiple candidate transmission modes, each candidate transmission mode having a same determined highest aggregate throughput; and selecting a transmission mode for use by the transmitter among the candidate transmission modes based on the SINRs of the candidate transmission modes when it is determined that there are multiple candidate transmission modes. Each transmission mode specifies a transmission from the transmitter to the receiver of one or more layers via one or more antennas at the transmitter, and specifies a mapping of codewords to layers.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

DETAILED DESCRIPTION

Figure 1:
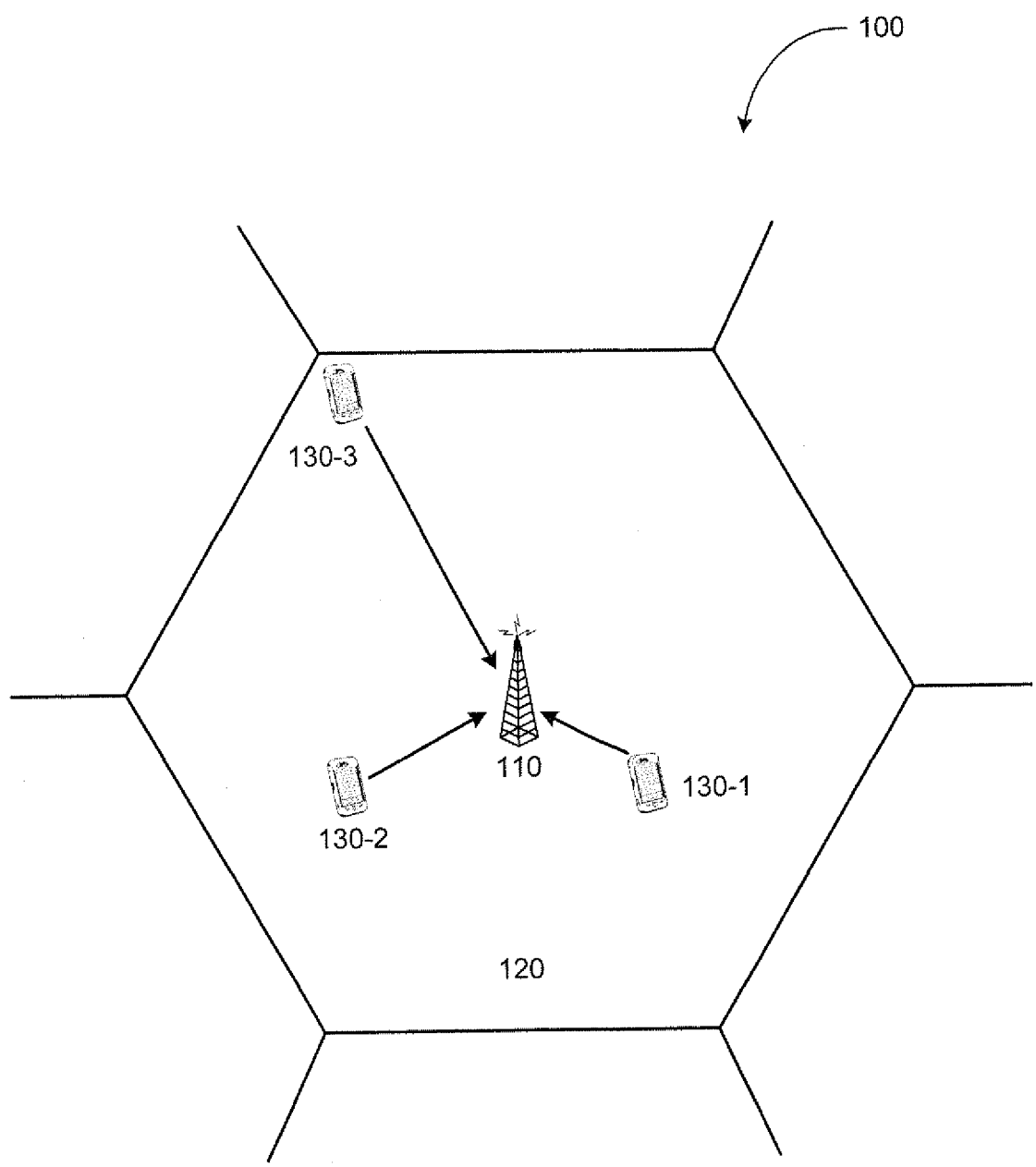
FIG. 1 illustrates an example scenario in which user equipments transmit known signals to an eNodeB of a wireless network to facilitate transmission modes selected by the eNodeB.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors", "controllers" or "units" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor", "controller" or "unit" should not be construed to refer exclusively to hardware capable of executing software, and may include, without limitation, digital signal processor (shortened to "DSP") hardware, read only memory (shortened to "ROM") for storing software, random access memory (shortened to "RAM"), and non-volatile storage.

In this document, 3GPP, and in particular LTE, is primarily used as examples for explanation purposes. However, the scope of this disclosure is not limited to the set of 3GPP wireless network systems and can encompass many domains of wireless network systems. These include WCDMA, WiMax, UMB, GSM and WLAN. Also terms such as a base station (e.g. RBS, NodeB, eNodeB) and wireless terminals (e.g. user equipment (UE), mobile terminal (MT)) will be used and the terms do not imply any hierarchical relation between the two. The base station maybe considered as device 1 (or receiver) and the UE maybe considered as device 2 (or transmitter), and the two devices communicate with each other over a radio channel.

It is worth noting that the disclosed subject matter is, at least in part, directed to transmission mode adaptation. The aforementioned precoder selection is one example of transmission mode adaptation. More generally, transmission mode adaptation may include selection of any configuration that may affect the throughput, for example, switching between diversity and multiplexing (MIMO mode switching). When multiple users are concerned, the adaptation may also include any scheduling decision such as frequency-selective scheduling and MU-MIMO (multiple user—MIMO).

As noted above, the conventional mode adaptation method does not account for the gain imbalance between the channel for measurement (e.g., SRS channel) and the channel for data reception (e.g., PUSCH). Therefore, the precoder, which is selected based on the measurement channel, may not be the optimal precoder for the data reception channel. Another problem of the conventional mode adaptation method is that multiple precoders may reach the highest calculated throughput based on the measurement, and there is no effective way to break a tie.

One or more aspects the disclosed subject matter address these and other disadvantages of the conventional mode adaptation by generally avoiding highest/lowest MCS. Equivalently, saturation of throughput is generally avoided and information on the SINR are kept in spite of the imbalance variation between the measurement of signals on one channel (e.g. SRS) and actual data reception on another channel (e.g. PUSCH). As long as the relative superiority among the transmission modes is preserved, it is possible to select the transmission mode that maximizes the hypothetical throughput for measurement and, with a high probability, also maximizes the actual throughput. This is often the case, when multiple antennas experience the same gain increase/decrease, or even when they experience slightly different gain increase/decrease. SINR is but one of several quality characteristics that may be used to determine relative superiorities.

It should be noted the term SINR should be taken broadly so as to also encompass similar concepts such as signal-to-noise ratio (SNR). Generally, SINR is to include any concept that relates wanted or desired signals to unwanted or undesired signals. Thus, SINR and SNR are used interchangeably in this document. Also while it is customary to express concepts such as SINR and SNR as a ratio, this is not a requirement. For example, the relationship may be expressed as a difference.

The following are just some of the ways that the transmission mode for use by the transmitter may be selected or otherwise adapted by the receiver.

Compare effective SINRs for transmission modes (instead of comparing their throughput) and select the transmission mode that maximizes the effective SINR.

Map the effective SINRs of transmission modes to channel capacities (instead of mapping SINRs to MCSs), and select the transmission mode that maximizes the channel capacity.

Incorporate additional higher/lower MCS levels to the conventional SINR-to-MCS mapping.

Back off the effective SINR—either positive or negative—so that the effective SINR for each transmission mode lies within the SINR range of MCS used in the system.

When there are multiple transmission modes that reach the highest possible throughput, calculate the largest possible backoff value for each of these transmission modes to still maintain the highest possible transmission rate, and select the transmission mode that allows the largest back off value.

An example scenario to explain various aspects of the disclosed subject matter is described below. Assume an uplink transmission such as LTE UL with a 1.08 MHz transmission bandwidth. In other words, the UE is the transmitter and the eNodeB is the receiver. Also assume that the UE has at least two transmit antennas such that codebook of Table 1 applies. Further, let $PC_{k,n}$ denote a precoder of rank k and PMI (precoding matrix indicator) n corresponding to the Table 1 codebook, and let $SINR_{k,n}$ and $TP_{k,n}$ respectively denote the effective SINR and corresponding throughput for the precoder $PC_{k,n}$. Yet further, assume that effective SINR and throughput for the actual PUSCH are calculated as follows for different precoders in Table 1:

| | | |
|---|---|---|
| $PC_{1,0}$ | $SINR_{1,0}$ = 9.0 dB | $TP_{1,0}$ = 2.152 Mbps |
| $PC_{1,1}$ | $SINR_{1,1}$ = 12.2 dB | $TP_{1,1}$ = 2.792 Mbps |
| $PC_{1,2}$ | $SINR_{1,2}$ = 6.8 dB | $TP_{1,2}$ = 1.736 Mbps |
| $PC_{1,3}$ | $SINR_{1,3}$ = 13.1 dB | $TP_{1,3}$ = 2.984 Mbps |
| $PC_{2,0}$ | $SINR_{2,0}$ = −3.2 dB, 6.4 dB | $TP_{2,0}$ = 0.328 Mbps, 1.544 Mbps |

In this example, rank 1 precoders implementing antenna selection $PC_{1,4}$ and $PC_{1,5}$ are not considered. This is because they always have a smaller effective SINR than other rank 1 precoders $PC_{1,0}$, $PC_{1,1}$, $PC_{1,2}$, and $PC_{1,3}$. Also note that the rank 2 precoder $PC_{2,0}$, has two effective SINRs, one SINR for each layer. In this example, $PC_{1,3}$ actually has the highest throughput.

Further assume the gain imbalance between SRS and the PUSCH is such that the there is a gain increase of 9 dB. Then the effective SINR and the corresponding throughput of the SRS are calculated as follows:

| | | |
|---|---|---|
| $PC_{1,0}$ | $SINR_{1,0}$ = 18.0 dB | $TP_{1,0}$ = 4.392 Mbps |
| $PC_{1,1}$ | $SINR_{1,1}$ = 21.2 dB | $TP_{1,1}$ = 4.392 Mbps |
| $PC_{1,2}$ | $SINR_{1,2}$ = 15.8 dB | $TP_{1,2}$ = 3.752 Mbps |
| $PC_{1,3}$ | $SINR_{1,3}$ = 22.1 dB | $TP_{1,3}$ = 4.392 Mbps |
| $PC_{2,0}$ | $SINR_{2,0}$ = 4.3 dB, 11.9 dB | $TP_{2,0}$ = 1.192 Mbps, 2.792 Mbps |

All rank 1 precoders experience the same increase in effective SINR by 9 dB. The rank 2 precoder experiences a slightly smaller increase, since a higher gain also implies a higher inter-layer interference level, and commonly used receivers such as a linear MMSE (Minimum Mean Square Error) receiver do not completely eliminate inter-layer interference.

An important observation to make is that the rank 1 precoders $PC_{1,0}$, $PC_{1,1}$ and $PC_{1,3}$ are all calculated to have the same throughput although their SINRs are different. Observe that in Table 3, MCS 28 with a throughput of 4.392 Mbps is the highest MCS that can be selected. The minimum required SINR of 17.78 dB for MCS 28 is met by the precoders $PC_{1,0}$, $PC_{1,1}$ and $PC_{1,3}$. As a result, the calculated throughput for all three precoders would be the same.

But in this example, the precoder that actually maximizes the throughput for the PUSCH is $PC_{1,3}$ as indicated above. However, because of the gain increase in SRS, the three rank 1 precoders $PC_{1,0}$, $PC_{1,1}$ and $PC_{1,3}$ are all calculated to maximize the throughput. This demonstrates that based on SRS, there is no guarantee of selecting $PC_{1,3}$ instead of $PC_{1,0}$ or $PC_{1,1}$. That is to say, there is no effective way to break a tie.

In the conventional mode adaptation method, any precoder with the highest MCS can be chosen depending on the choice implementation. For example, the throughput for all the possible precoders may be calculated in a predefined order such as from $PC_{1,0}$ to $PC_{1,3}$ and ending with $PC_{2,0}$. Assume that, in order to search the precoder maximizing throughput, the throughput of a precoder is compared with the maximum throughput of the previously-calculated precoders, and the maximum throughput is updated only when the newly-calculated throughput is larger. In this case, the receiver ends up selecting the precoder $PC_{1,0}$, which is the first precoder (in the search order) that achieves the maximum throughput. As demonstrated above, the first precoder is not the best precoder in actuality.

Simply put, there is no way of guaranteeing the selection of the precoder that maximize the actual throughput for PUSCH, if, based on SRS measurement, multiple precoders reach the highest MCS and therefore all of them are calculated to achieve the maximum throughput. Thus, selecting the MCS through comparing the effective throughputs calculated based on the SRS measurement falls short.

Instead of comparing the effective throughputs, in or more non-limiting aspects of the disclosed subject matter, the effective SINRs, which are calculated based on a channel measurement, are compared. The transmission mode that maximizes the effective SINR is chosen. There is a high probability that the selected transmission mode also maximizes the throughput of the data channel in spite of imbalance variation.

In these aspects, the receiver may select the transmission mode to be used by the transmitter. In transmission, one or more layers are transmitted over a channel via one or more antennas at the transmitter. A layer may be viewed to define a transport stream. The transmission mode may be viewed as any transmitter configuration that affects the aggregate throughput. These include precoder, the scheduler, and MU-MIMO. Thus, the precoder selection may be viewed as an example of selecting the transmission mode. More generally, the selection of the transmission mode can include any combination of selecting the precoder, scheduling, antenna configurations, and so on.

Figure 2:
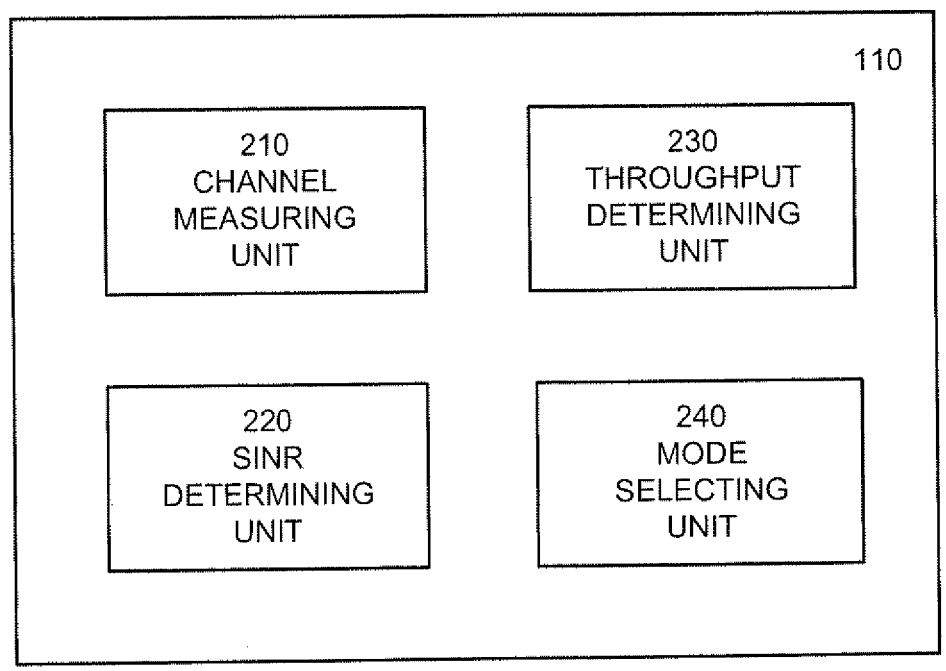
FIG. 2 illustrates a block diagram of a non-limiting embodiment of a receiver structured to perform transmission mode adaption.

The receiver may adaptively select the transmission mode for the transmitter. FIG. 2 is a block diagram illustrating an example of a receiver, such as the eNodeB 110 in FIG. 1 of the wireless network 100, that is structured to adaptively select the transmission mode for transmitters such as the UEs 130. That is, the receiver 110 is structured to perform transmission adaptation.

As seen, the receiver 110 includes a channel measuring unit 210, an SINR determining unit 220, a throughput determining unit 230, and a mode selecting unit 240. The channel measuring unit 210 is structured to measure signals transmitted from a transmitter 130; the SINR determining unit 220 is structured to determine the SINR of the signal measured by the channel measuring unit 210; the throughput determining unit 230 is structured to determine the throughputs of one or more transmission modes over a wireless channel; and the mode selecting unit 240 is structured to select the transmission mode for the transmitter 130. Further details of the units of the receiver 110 will be provided in conjunction with the descriptions of example method for performing transmission mode adaptation.

FIG. 2 is a logical representation of the receiver 110. Thus, each of the channel measuring unit 210, the SINR determining unit 220, the throughput determining unit 230, and the mode selecting unit 240 need not be physically separate from each of the other units. It is fully contemplated that any combination of the units may be integrated into a single physical device. Further, each of the receiver units may be implemented in multiple physical components operatively structured and coupled to each other to perform the respective function of the unit. Yet further, to the extent that some of the unit share common features, multiple units may share common components.

While not explicitly shown, it is also contemplated that the receiver 110 as a whole can be implemented as a combination hardware and software components. For example, the receiver may include one or more processors, which as described above can combinations of hardware and software, arranged to perform functions associated with the units. The processors may execute programming instructions stored in a non-transitory computer readable medium to perform the functions. The programming instructions may also be received in a transitory manner and stored in the non-transitory computer readable medium accessible to the receiver. For example, updates may be received.

Figure 3:
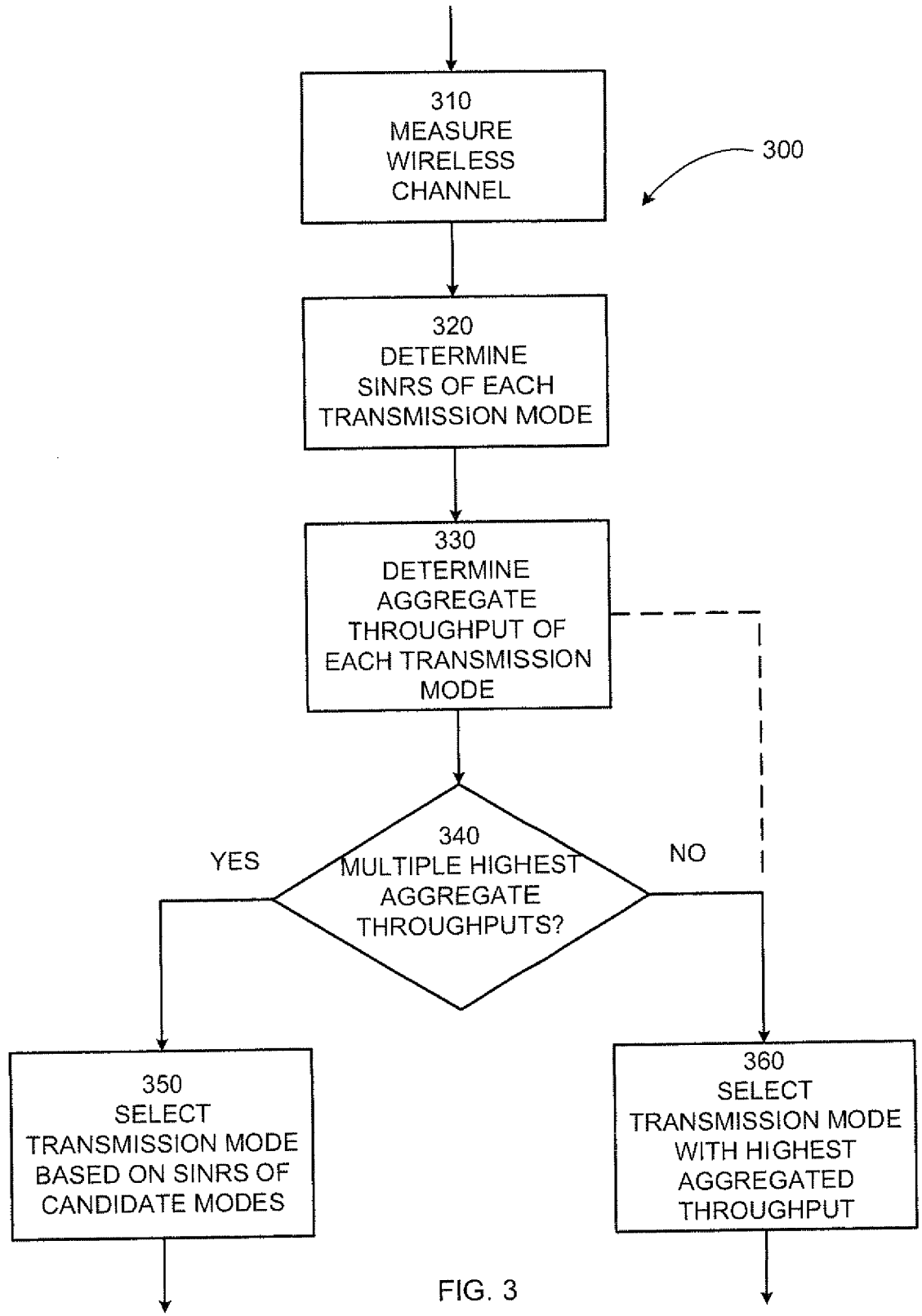
FIG. 3 illustrates a non-limiting method for performing transmission mode adaptation.

FIG. 3 illustrates a non-limiting method 300 for performing transmission mode adaptation. The method 300 may be performed at or on behalf of an eNodeB 110 (i.e., a receiver) of a wireless network 100. Overall, the method 300 is as follows. In step 310, a signal transmitted wirelessly from a UE 130 (i.e., a transmitter) is used to measure a wireless channel. In step 320, one or more SINRs for each of a plurality of transmission modes are determined based on the wireless channel measurement. In step 330, an aggregate throughput of each transmission mode is determined based on the SINR(s). In step 340, it is determined whether there are multiple candidate transmission modes based on the SINR(s), each candidate transmission mode having a same highest aggregate throughput. When there are multiple candidate transmission modes, then in step 350, a transmission mode for use by the transmitter 130 is selected based on the SINRs of the candidate transmission modes. When there are no multiple candidate transmission modes, then in step 360, the transmission mode with the highest aggregate throughput is selected.

Each transition mode including the selected transmission mode can specify a transmission from the transmitter to the receiver of one or more layers via one or more antennas at the transmitter. In short, each transmission mode includes any transmission characteristics that affect the aggregate throughput of the transmission. Each transmission mode, including the selected mode includes a precoder, which can specify a spreading weight of each layer of the transmission over each of the transmitter antennas. Each transmission mode can specify a mapping of codewords to layers.

The steps of the method 300 are described in further detail below. In step 310 of the method, the channel measuring unit 210 measures the wireless channel based on a signal transmitted from a UE 130 (i.e., a transmitter). SRS is an example of the signal that can be measured. SRS is a known signal transmitted by the UE 130. By comparing the known transmitted signal with the actual received signal, the eNodeB 110 can better estimate the characteristics of the link between the eNodeB 110 and the UE 130.

However, SRS is not the only signal that can be measured. Any signal that the eNodeB 110 has some beforehand knowledge of its characteristics at transmission from the UE 130 can be used. The beforehand knowledge in conjunction with the characteristics of the signal at reception can be used to more accurately determine the characteristics of the radio link between the UE 130 and the eNodeB 110.

The beforehand knowledge can come in many forms. For some signals such as SRS, the characteristics at transmission are predetermined. For other signals, the eNodeB 110 or any network nodes of the wireless system 100 may instruct the UE 130 to transmit the signal at a particular level. There may also be signals whose characteristics are known statistically. The statistical knowledge may be generic to apply to a class such as to all UEs of a particular model or may be specific to apply to a particular UE. The data part of the signal transmitted from UE, for example, PUSCH in LTE UL, where actual data information is conveyed, can be one example, since only the statistical knowledge is available to the eNodeB. Note that, being assisted by a decision feedback equalizer, the data part of the signal can be utilized as the signal whose characteristics at transmission are completely known to the eNodeB (similarly to SRS).

Figure 4:
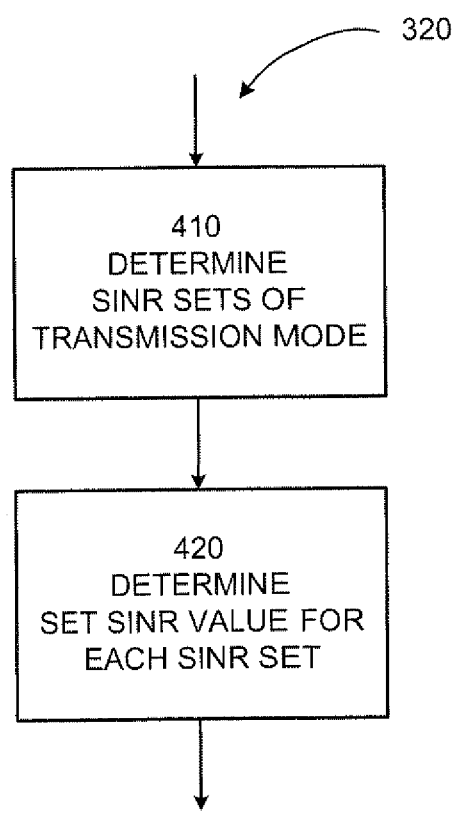
FIG. 4 illustrates a flow chart of an example process to determine SINRs of transmission modes.

In step 320, the SINR determining unit 220 determines one or more SINRs for each of a plurality of transmission modes based on the measurements made by the channel measuring unit 210. FIG. 4 is a flow chart of an example process to implement step 320. The steps of the process illustrated in FIG. 4 are performed for each of the plurality of transmission modes.

The number of transmission modes considered in this step as well as in step 330 (described in detail below) can vary depending on the circumstances. In LTE UL with a 2-TX UE and SC-FDMA for example, there can be seven transmission modes that can be considered, one for each precoder—six of rank 1 ($PC_{1,0}$ to $PC_{1,5}$) and one of rank 2 ($PC_{2,0}$) as seen in Table 1. But as indicated above, the number of considered transmission modes can be reduced by removing from consideration the transmission modes with precoders associated with antenna selection ($PC_{1,4}$ and $PC_{1,5}$) since these precoders will have smaller SINRs than other rank 1 precoders.

The number of transmission modes that can be considered in LTE UL with a 4-TX UE can be as many as 53-24 of rank 1 ($PC_{1,0}$ to $PC_{1,23}$), 16 of rank 2 ($PC_{2,0}$ to $PC_{2,15}$), 12 of rank 3 ($PC_{3,0}$ to $PC_{3,11}$) and 1 of rank 4 ($PC_{4,0}$) as seen in Table 2. But again, this number may be reduced by eliminating from consideration those transmission modes whose SINR will always be no greater than that of at least one other transmission mode. Note these are not the same precoders as in Table 1. For example, $PC_{1,0}$ associated with the codebook of Table 1 is not the same as $PC_{1,0}$ associated with the codebook of Table 2.

In step 410, the SINR determining unit 220 determines one or more SINR sets of the transmission mode based on the measured wireless channel. Each SINR set may be viewed as a set of SINR values whose corresponding time/frequency/space resources are mapped into a single codeword, e.g., a transport block in LTE. Thus, each SINR set may be viewed as being associated with a codeword, and the number of SINR sets of each transmission mode corresponds with, i.e., is equal to the number of codewords specified in the transmission mode.

Each SINR set has one or more SINR values. The number of individual SINR values that each SINR set is related to a mapping of layers to the codeword associated with the SINR set, and this number will depend largely on the particular access scheme such as SC-FDMA (single carrier frequency division multiple access) and OFDMA (orthogonal frequency division multiple access). In SC-FDMA for example, the number of SINR values in a SINR set corresponds to the number of layers mapped to the codeword corresponding to the SINR set. In the case of LTE UL with a 2-TX UE as exemplified in the above-described scenario, each layer is mapped to one SINR set and each SINR set has a single SINR value. Then for transmission modes with rank 1 precoders (e.g., $PC_{1,0}$, $PC_{1,1}$, $PC_{1,2}$, $PC_{1,3}$, $PC_{1,4}$ and $PC_{1,5}$) of codebook in Table 1, one SINR set with one SINR value will be determined for each transmission mode. For the transmission mode with the rank 2 precoder (e.g., $PC_{2,0}$), two SINR sets each with one SINR value will be determined.

On the other hand, in the case of LTE UL with a 4-TX UE and SC-FDMA, the following mappings between codewords and layers are possible.

One codeword, one layer (rank 1)—one SINR set with one SINR value;

One codeword, two layers (rank 2)—one SINR set with two SINR values (used less frequently);

Two codewords, two layers (rank 2)—two SINR sets each with one SINR value (used more frequently);

Two codewords, three layers (rank 3)—one SINR set with two SINR values, one SINR set with one SINR value; and Two codewords, four layers (rank 4)—two SINR sets each with two SINR values.

In OFDMA such as in LTE DL, the number of SINR values in each SINR set corresponds to the number of subcarriers of layers mapped to the codeword. Each SINR value may be viewed as an indication of a hypothetical reception quality at a specific subcarrier of a specific layer. Note that one or multiple layers can be mapped to a codeword in OFDMA, and there can be one or multiple codewords specified in the transmission mode. This implies that for a transmission mode specifying transmission in OFDMA, the SINR determining unit 220 will determine one or more SINR sets and will determine multiple SINR values for each SINR set.

It should be noted that SC-FDMA and OFDMA are not the only access schemes that are contemplated. For example, CDMA (code division multiple access) can also be used as the access scheme in many systems. Like SC-FDMA, CDMA use a single-carrier waveform; thus the transmission mode adaptation schemes we describe for SC-FDMA are also applicable to CDMA.

In step 420, the SINR determining unit 220 determines a set SINR value of each SINR set based on the individual SINR values in the SINR set. In the simple case where there is only one SINR value in the SINR set, the single SINR value effectively becomes the set SINR value.

Figure 10:
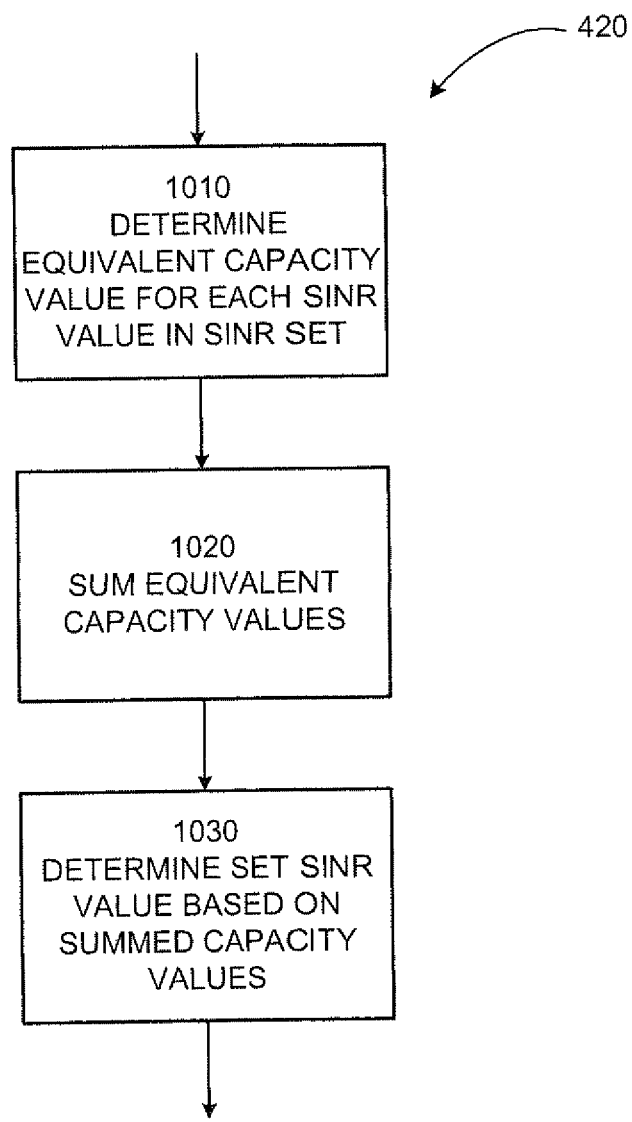
FIG. 10 illustrates a flow chart of an example process to determine set SINR values.

When there are multiple SINR values in the SINR set however, the individual SINR values of the set may be processed to generate the set SINR value. FIG. 10 illustrates a flow chart of an example process to implement step 420 when there are multiple SINR values in the SINR set. The steps illustrated in FIG. 10 can be performed by the SINR determining unit 220. In step 1010, an equivalent capacity value for each individual SINR values in the SINR set is determined. In step 1020, the equivalent capacity values are summed. Then in step 1030, the set SINR value is determined based summed capacity values.

In one aspect of applying the steps of FIG. 10, multiple SINR values in the SINR set maybe converted to the set SINR value according to the following equation:

$$\bar{\gamma} = 2^{\frac{1}{K}\sum_{k=0}^{K-1}\log_2(1+\gamma(k))} - 1 \tag{1}$$

In equation (1), $\bar{\gamma}$ represents the set SINR value. Here, it is assumed that there are K SINR values in the SINR set and γ(k), k=0 to K−1, represents each SINR value in the SINR set, and the quantity $\log_2(1-\gamma(k))$ represents the equivalent capacity value for each SINR value. While base 2 calculation is used in equation (1), this is not a limitation. Other bases may be used such as base 10. Even natural log "ln" and exponent "e" may be used as exemplified in equation (2).

$$\overline{\gamma} = e^{\frac{1}{K}\sum_{k=0}^{K-1} ln(1+\gamma(k))} - 1 \quad (2)$$

In another aspect, the set SINR value may be expressed as a mean of reliability of a carrier represented by each SINR value. For example, an equivalent capacity value may be a quantitative reliability measurement based on the individual SINR value and may be expressed as $(1+\gamma(k))$. Then the set SINR value may be calculated according to the following equation:

$$\overline{\gamma} = \left(\frac{1}{K}\sum_{k=0}^{K-1}(1+\gamma(k))^{-1}\right)^{-1} - 1 \quad (3)$$

While harmonic mean is shown in equation (3), this is not a limitation. Other means calculations such as arithmetic or geometric mean may be used. Care should be taken to convert the individual SINR values γ(k) expressed in decibels to true ratios when calculating the mean.

Figure 5:
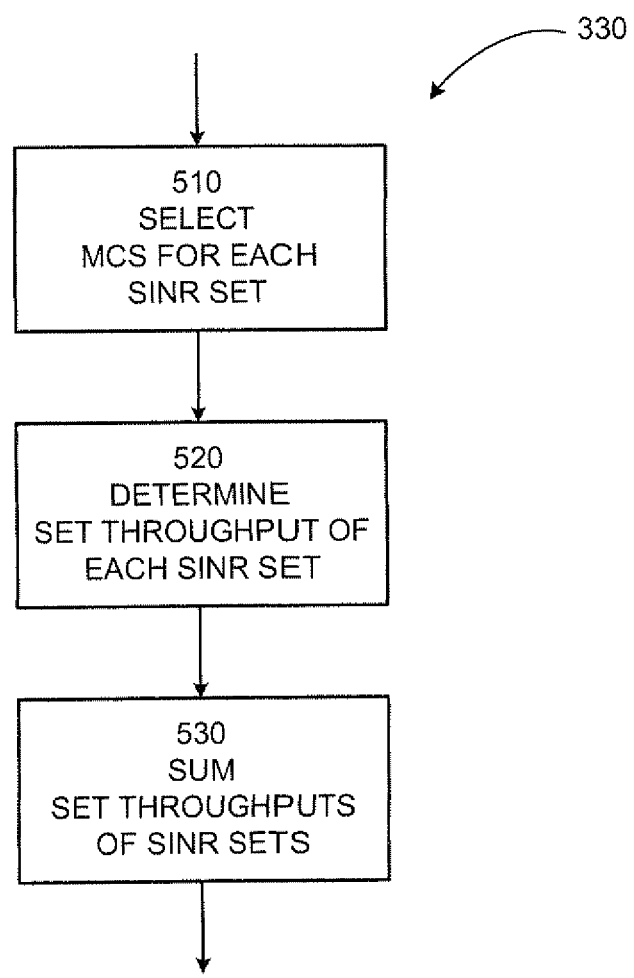
FIG. 5 illustrates a flow chart of an example process to determine aggregate throughputs of transmission modes.

Referring back to FIG. 3, the throughput determining unit 230 in step 330 determines the aggregate throughput of each of the plurality of transmission modes based on the SINR sets determined by the SINR determining unit 220. FIG. 5 is a flow chart of an example process to implement step 330. The steps of the process illustrated in FIG. 5 are also performed for each of the plurality of transmission modes.

In step 510, the throughput determining unit 230 selects an MCS from a plurality of MCSs for each SINR set of the transmission mode. The MCS maybe selected from an MCS table appropriate for the precoder of the transmission mode such as Table 3. The selected MCS specifies a required set SINR value applicable to the SINR set of the transmission mode. For simplicity, the required SINR set value of the selected MCS will be simply referred to as the "required set value". The required set value may be a minimum SINR threshold value for the MCS.

Thus, in step 510, the throughput determining unit 230 selects the highest MCS whose required set value is met by the set SINR value. This necessarily implies that there is an ordering of the MCSs such as illustrated in Table 3. The ordering may be based on one or more performance characteristics such as throughput where higher MCSs have greater throughputs. Other performance characteristics that can be used include error rates such as BLER (block error rate) and BER (bit error rate) where higher MCSs have lower error rates. MCSs may also be ordered based on a weighted score of multiple performance characteristics.

In step 520, the throughput determining unit 230 determines a set throughput of each SINR set based on the corresponding MCS selected for the set. Recall that in Table 3, for each particular transmission bandwidth (1.08 or 5 MHz), there is one required SINR value specified for each MCS. Further, each MCS is associated with a particular throughput. The throughput determining unit 230 determines the throughput of the selected MCS as the set throughput of the corresponding SINR set in step 520. Then in step 530, the throughput determining unit 230 sums the set throughputs of all SINR sets of the transmission mode as an aggregate throughput of the transmission mode.

As an illustration, steps 320 and 330 illustrated in FIGS. 4 and 5 for transmission modes associated with rank 1 precoder $PC_{1,3}$ and rank 2 precoder $PC_{2,0}$ in the scenario described above is explained for a 2-TX transmitter transmitting in SC-FDMA with a bandwidth of 1.08 MHz. For $PC_{1,3}$, the SINR determining unit 220 determines one SINR set with one SINR value of 22.1 dB for the transmission mode (step 410), and determines that the set SINR value is also 22.1 dB (step 420). The throughput determining unit 230 then selects MCS 28 from Table 3 (step 510), determines 4.392 Mbps as the set throughput (step 520), and determines 4.392 Mbps also as the aggregate throughput of the transmission mode (step 530).

For $PC_{2,0}$, the SINR determining unit 220 determines two SINR sets—a first SINR set with one SINR value of 4.3 dB and a second SINR set with one SINR value of 11.9 dB (step 410). The SINR determining unit 220 determines the first and second set SINR values as 4.3 dB and 11.9 dB (step 420). The throughput determining unit 230 selects MCSs 12 and 22 (step 510), determines 1.192 Mbps and 2.792 Mbps as the first and second set throughputs (step 520), and determines 3.984 Mbps as the aggregate throughput of the transmission mode (step 530).

In the case of LTE UL with a 4-TX UE and SC-FDMA, one mapping possibility between layers and codewords is that two layers can be mapped to one codeword. In this instance, the SINR determining unit 220 determines one SINR set with two SINR values (step 410). In step 420, the SINR determining unit 220 determines the set SINR value based on the two SINR values. The set SINR value can be determined according to the process illustrated in FIG. 10. Note that equations (1), (2) and (3) described above are just some of many specific implementations of FIG. 10. The calculated set SINR value may be viewed as being indicative the hypothetical reception quality of the associated codeword. The set SINR value can be used together with an MCS table to select a single MCS, which is used by both of the layers mapped to the codeword. That is, the throughput determining unit 230 can then select an MCS from an MCS table based on the set SINR value (step 510), determine the set throughput from the selected MCS (step 520), and determine the aggregate throughput of the transmission mode (step 530). The MCS table maybe the same as Table 3 or can be another table.

Further, in the case of LTE DL with a 2-TX eNodeB and OFDMA, multiple subcarriers of a specific layer is mapped to each codeword. In this instance, the SINR determining unit 220 determines one SINR set for each codeword (of which there can be one or more) with multiple SINR values in each SINR set (step 410). The number of SINR values of each SINR set corresponds to the number of subcarriers of the layers mapped to the codeword. In step 420, the SINR determining unit 220 determines the set SINR values of the SINR sets. The set SINR value determination can be performed according to FIG. 10 such as equations (1), (2) and (3) described above. The throughput determining unit 230 then selects an MCS for each set SINR value from an MCS table (step 510), determines the set throughputs from the selected MCSs (step 520), and determines the aggregate throughput of the transmission mode (step 530). The MCS table in this instance is likely different from Table 3 since there can be different number of resource elements available for the data channel.

Referring back to FIG. 3, after the aggregate throughputs of the transmission modes are determined, then in step 340, the mode selecting unit 240 determines whether there are multiple transmission modes having the same highest aggregate throughput. For ease of reference, each transmission mode with the highest aggregate throughput is referred to as a candidate transmission mode. In the above-described example scenario for example, transmission modes with precoders $PC_{1,0}$, $PC_{1,1}$ and $PC_{1,3}$ will be identified as candidate transmission modes. When there are multiple candidate transmission modes, then in step 350, the mode selecting unit 240, on its own or in conjunction with the SINR determining unit 220 or the throughput determining unit 230, selects a transmission mode among the candidate transmission modes based on the SINRs of the candidate transmission modes.

Figure 6:
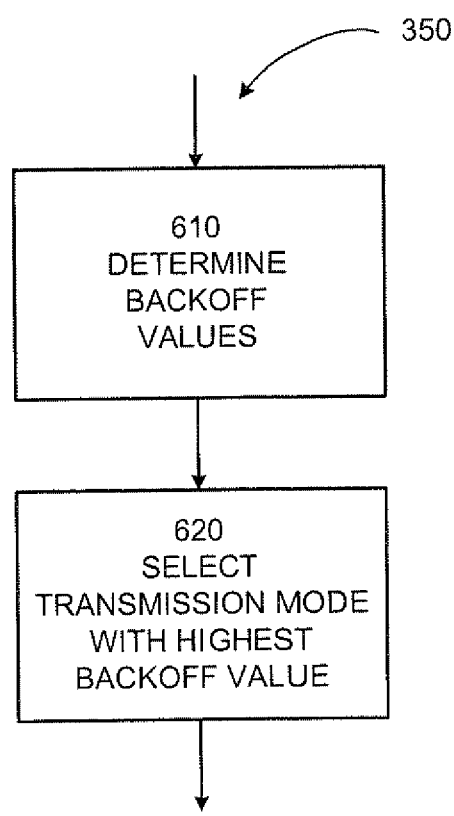
FIGS. 6-9 illustrate flow charts of example processes to select a transmission mode.

FIG. 6 illustrates a flow chart of an example process to implement step 350. The process in FIG. 6 maintains the relative SINR ordering. In step 610 of the process, the mode selecting unit 240 determines a backoff value for each candidate transmission mode. The backoff value is a largest value that can be backed off from the set SINR values of the candidate transmission mode and still maintain the same highest throughput. When there are multiple set SINR values determined for the transmission mode, the same backoff value may be applied to each set SINR value. In step 620, the mode selecting unit 240 selects the candidate transmission mode having the highest backoff value among the candidate transmission modes as the selected transmission mode.

Again using the example scenario described above and assuming the effective SINR=17.8 dB is required to support a transmission rate of 4.392 Mbps, then the backoff values for the candidate transmission modes of precoders $PC_{1,0}$, $PC_{1,1}$ and $PC_{1,3}$ are 0.2 dB, 3.4 dB, and 4.3 dB, respectively. With these backoff values, all three precoders can maintain 4.392 Mbps transmission rate. But since $PC_{1,3}$ has the largest backoff value, it will be selected under the process illustrated in FIG. 6.

The process illustrated in FIG. 6 is useful for resolving a tie between transmission modes of different ranks. Consider the following example in which the scenario described above is slightly modified.

| | | |
|---|---|---|
| $PC_{1,0}$ | $SINR_{1,0}$ = 18.0 dB | $TP_{1,0}$ = 4.392 Mbps |
| $PC_{1,1}$ | $SINR_{1,1}$ = 21.2 dB | $TP_{1,1}$ = 4.392 Mbps |
| $PC_{1,2}$ | $SINR_{1,2}$ = 15.8 dB | $TP_{1,2}$ = 3.752 Mbps |
| $PC_{1,3}$ | $SINR_{1,3}$ = 22.1 dB | $TP_{1,3}$ = 4.392 Mbps |
| $PC_{2,0}$ | $SINR_{2,0}$ = 6.3 dB, 11.9 dB | $TP_{2,0}$ = 1.6 Mbps, 2.792 Mbps |

Note that, in this modified scenario, the rank 2 precoder $PC_{2,0}$ achieves an aggregate throughput of 4.392 Mbps, and thus is also a candidate transmission mode along with precoders $PC_{1,0}$, $PC_{1,1}$ and $PC_{1,3}$. But here, any positive backoff for $PC_{2,0}$ drops its aggregate throughput to be lower than 4.392 Mbps. For example, applying a 1 dB backoff to $PC_{2,0}$ gives rise to $SINR_{2,0}$=5.3 dB, 10.9 dB, $TP_{2,0}$=1.352 Mbps, 2.6 Mbps resulting in an aggregate throughput of 3.952 Mbps. On the other hand, $PC_{1,3}$ maintains a transmission rate of 4.392 Mbps even with a 4.3 dB backoff. Thus $PC_{1,3}$ is superior to $PC_{2,0}$ and it will be selected.

At the opposite extreme, there may be a gain decrease between the measured signal and the data channel such that none of the set SINR values of the transmission modes reaches even the lowest SINR requirement. In this situation, the backoff values calculated in step 610 would be negative.

Figure 7:
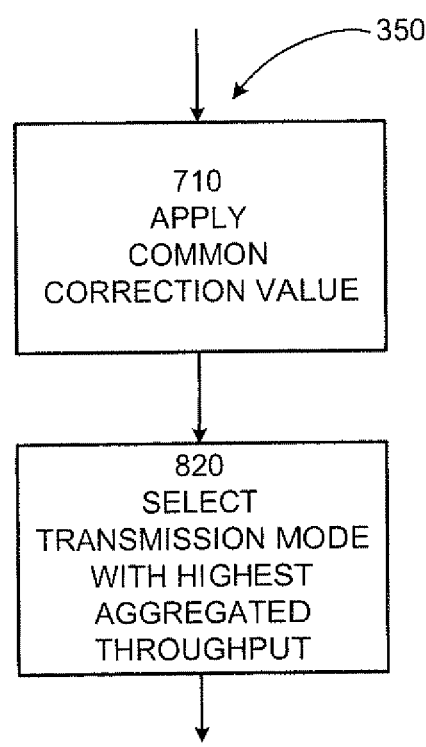

FIG. 7 illustrates a flow chart of another example process to implement step 350 to select the transmission mode. Like the process in FIG. 6, relative SINR ordering is maintained. In step 710, the mode selecting unit 240 applies a common correction value to the set SINR values of each candidate transmission mode such that the corrected set SINR values of the candidate transmission modes all lie in a range of the required values of the plurality of MCSs. Then in step 720, the mode selecting unit 240 selects a candidate transmission mode whose corrected set SINR values map to the MCSs such that the aggregate throughput of the selected transmission mode is highest among the candidate transmission modes. This again assumes that the MCSs are ordered based on throughputs.

In the process illustrated in FIG. 7, a negative correction value (positive back-off) would be added to the set SINR values when multiple transmission modes reach the highest MCS, and a positive correction value (negative back-off) would be added when multiple transmission modes reach the lowest MCS. The correction value can be defined in any scale such as the dB scale and can be either pre-determined or adapted on the fly.

Figure 8:
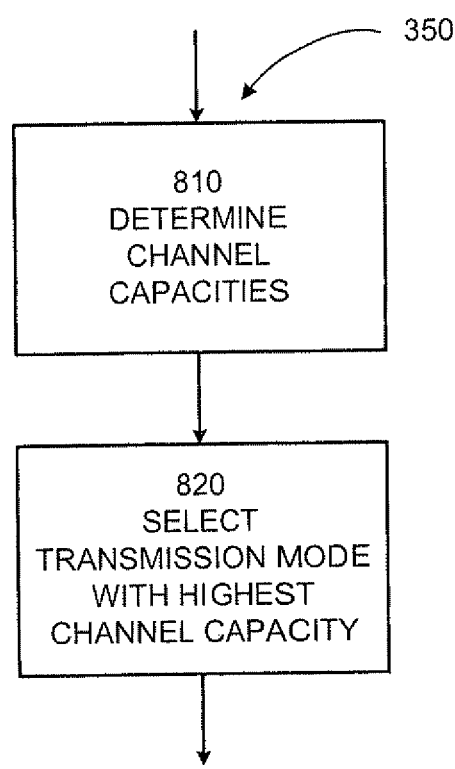

FIG. 8 illustrates a flow chart of yet another example process to select a transmission mode. In this process, the SINR sets of the candidate transmission modes are mapped into channel capacities. The use of channel capacity instead of MCS may result in over-estimating the channel quality, and thus in unnecessary retransmissions. To avoid this situation, the SINR-to-capacity mapping can be used when multiple transmission modes reach the highest aggregate throughput. That is, the process illustrated in FIG. 8 can be used to break a tie.

In step 810, the throughput determining unit 230 determines a channel capacity of each candidate transmission mode based on the set SINR values. This should be differentiated from the conventional adaptation method that maps SINRs directly to the MCS of the system. As an example, the channel capacity C of each SINR set may be determined through an equation $C=\log_2(1+SINR)$ and the capacities of the SINR sets may be summed. The SINR in this equation can correspond to the set SINR value as discussed above. While base 2 log is provided, this is not a limitation. Other bases may be used such as base 10 or natural log. In step 820, the mode selecting unit 240 selects the candidate transmission mode having the highest channel capacity as the selected transmission mode.

Figure 9:
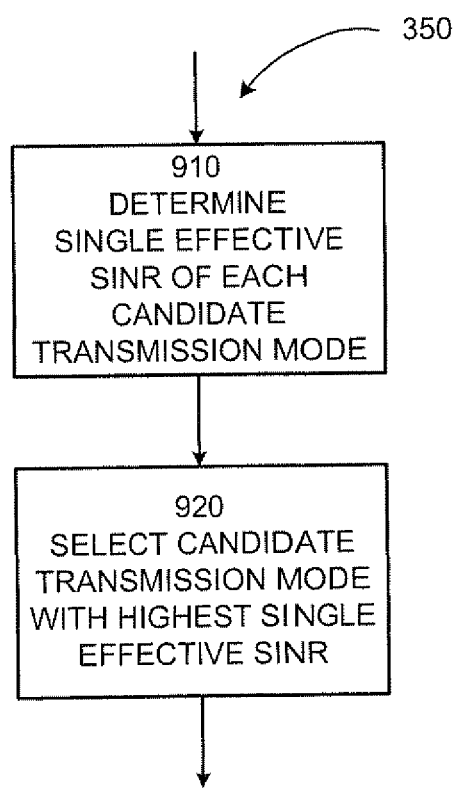

FIG. 9 illustrates a yet further example process to implement step 350. In this process, the SINR determining unit 220 determines a single effective SINR for each candidate transmission mode based on the set SINR values of the candidate transmission mode in step 910. Here, the calculation of the single effective SINR may be based on equations (1), (2) and (3), except that the set SINR values can be used. Then in step 920, the mode selecting unit 240 selects the candidate transmission mode whose single effective SINR is highest among the candidate transmission modes.

In the simplest case, each candidate transmission mode is such that there is one SINR set and one SINR value in the SINR set. Then the SINR value of the SINR set determined in step 320 is the effective single SINR of the candidate transmission mode. In the example scenario above, the transmission mode with $PC_{1,3}$ would be selected since the single effective SINR of 22.1 dB of this precoder is the highest among the candidate transmission modes.

Referring back to FIG. 3, recall that step 350 is entered when in step 340, it is determined that there are multiple candidate transmission modes. That is, step 350 is entered when there are ties in the throughput of different transmission modes.

On the other hand, step 360 is entered when there is no tie, i.e., there is one transmission mode whose aggregate throughput is the best among the transmission modes. One way to minimize the likelihood of having ties is to determine in step 330 the channel capacities of all transmission modes—not just the candidate transmission modes—based on the set SINR values. The capacity calculation can be based on the same capacity equation used above with regard to FIG. 8.

The mode selecting unit 240 may still perform step 340 of determining whether there are multiple candidate transmission modes based on the channel capacities. In the unlikely event that multiple transmission modes are determined to have the same highest capacity, then the mode selecting unit 240 may perform any of the mode selecting processes as illustrated in FIGS. 6-9. But in another implementation, since channel capacities are unlikely to be the same for any two transmission modes, and even less likely that the there will be a tie at the top, the mode selecting unit 240 may proceed directly to step 360 to select the transmission mode with the highest aggregate throughput, i.e., select the transmission mode with the highest channel capacity.

While this may result in avoiding ties which can be useful, it can also result in over-estimating the channel quality which is undesirable. Thus, the advantages and disadvantages of such tradeoff should be considered.

While not shown in the figures, another way to minimize a tie from occurring is to add a few higher/lower MCS levels to the conventional SINR-to-MCS mapping. These additional MCS levels help to mitigate the probability of having multiple transmission modes that maximize the throughput. How many MCS levels we should add depends on how much gain increase/decrease that should be coped with: the more gain increase/decrease, the more MCS levels are necessary.

Note that the transmission modes can specify precoders. In one embodiment, the precoder specifies a precoder matrix to be used by the UE 130 for transmitting information to the eNodeB 110. To reduce signaling overhead between the UE 130 and the eNodeB 110, the eNodeB 110 may specify a rank and a matrix index to the UE 130, and the UE 130 selects one of plural predetermined precoder matrices.

In addition to the precoder, the transmission mode may specify a transmission scheme switching between spatial diversity and multiplexing. The transmission mode may also specify a scheduling scheme switching. Examples include frequency-selective switching and MU-MIMO (multi-user-multiple-input-multiple-output).

It should be noted that while the illustrated examples indicate that the eNodeB 110 determines the transmission mode to be used by the UE 130 based on a measurement of a wireless channel between the two, the situation can be reversed. In other words, the eNodeB 110 can function as the transmitter on downlink transmissions and the UE 130 can function as the receiver that provides feedback to the eNodeB 110 to influence which transmission mode the eNodeB 110 would use. The term influence is used in this instance since the eNodeB 110 is not generally bound to the transmission mode selected by the UE 130.

One of several advantages of the present invention is that the likelihood of selecting the transmission mode that maximizes the actual throughput is enhanced considerably over the conventional mode adaptation methods. Thus, it is expected that the use of the inventive transmission mode adaptation will result in enhanced performance relative to the conventional method.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments which may become obvious to those skilled in the art, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method for transmission mode adaptation performed at a receiver of a wireless network, the method comprising:
   measuring a wireless channel based on a signal transmitted from a transmitter;
   determining one or more signal-to-interference-plus-noise ratios (SINRs) for each transmission mode of a plurality of transmission modes based on the wireless channel measurement;
   determining an aggregate throughput of each transmission mode based on the one or more SINRs of that transmission mode;
   determining whether there are multiple candidate transmission modes for a transmission over the wireless channel, each candidate transmission mode having a same determined highest aggregate throughput among the plurality of transmission modes; and
   selecting a transmission mode for use by the transmitter from among the candidate transmission modes based on the one or more SINRs of the candidate transmission modes when it is determined that there are multiple candidate transmission modes,
   wherein each transmission mode specifies one or more parameters for a transmission from the transmitter to the receiver of one or more layers via one or more antennas at the transmitter, and specifies a mapping of codewords to layers.

2. The method of claim 1, wherein the step of determining the one or more SINRs for each transmission mode based on the wireless measurements comprises performing for each transmission mode:
   determining one or more SINR sets of that transmission mode based on the wireless channel measurements, each SINR set comprising one or more SINR values, wherein a number of SINR sets of that transmission mode is equal to a number of codewords to be transmitted in that transmission mode and wherein a number of SINR values in each SINR set is based on a mapping of layers to a codeword associated with that SINR set; and
   determining a set SINR value for each SINR set of that transmission mode based on the SINR values of that SINR set.

3. The method of claim 2, wherein the step of determining the set SINR value for each SINR set of that transmission mode based on the SINR values of that SINR set comprises:
   determining an equivalent capacity value for each SINR value in that SINR set;
   summing the equivalent capacity values; and
   determining the set SINR value of that SINR set based on the summed equivalent capacity values.

4. The method of claim 2, wherein the step of determining the aggregate throughput of each transmission mode based on the one or more SINRs of that transmission mode comprises performing for each transmission mode:

selecting a modulation and coding scheme (MCS) for each SINR set of that transmission mode from an ordered group of MCSs based on the set SINR value of that SINR set, wherein each MCS specifies a required set value and the MCS selected for that SINR set is a highest MCS in the ordered group of MCSs whose required set value is met by the set SINR value of that SINR set;

determining a set throughput of each SINR set based on the MCS selected for that SINR set; and summing the set throughputs of all SINR sets of that transmission mode to determine the aggregate throughput of that transmission mode.

5. The method of claim 2, wherein the step of selecting the transmission mode among the candidate transmission modes comprises:

determining a backoff value for each candidate transmission mode, the backoff value being a largest value that can be backed off from the set SINR value of each SINR set of that candidate transmission mode and still maintain the same highest aggregate throughput; and selecting the candidate transmission mode having the highest backoff value among the candidate transmission modes.

6. The method of claim 2, wherein the step of selecting the transmission mode from among the candidate transmission modes comprises:

applying a common correction value to the set SINR values of each candidate transmission modes such that the corrected set SINR values lie in a range of the required values of a plurality of MCSs; and selecting the candidate transmission mode whose corrected set SINR sets map to the MCSs such that the aggregate throughput of the selected transmission mode is highest among the candidate transmission modes.

7. The method of claim 2, wherein the step of selecting the transmission mode from among the candidate transmission modes comprises:

determining a channel capacity of each candidate transmission mode based on the set SINR values of that candidate transmission mode; and selecting the candidate transmission mode having a highest channel capacity among the candidate transmission modes.

8. The method of claim 2, wherein the step of selecting the transmission mode for use by the transmitter from among the candidate transmission modes when it is determined that there are multiple candidate transmission modes comprises:

determining a single effective SINR for each candidate transmission mode based on the set SINR values of that candidate transmission mode; and selecting the candidate transmission mode whose single effective SINR is highest among the candidate transmission modes.

9. The method of claim 2, wherein the step of determining the aggregate throughput of each transmission mode based on the SINRs of that transmission mode comprises determining a channel capacity of each transmission mode based on the one or more set SINR values of that transmission mode, and wherein the method further comprises selecting the transmission mode whose channel capacity is highest among the plurality of transmission modes.

10. The method of claim 1, wherein each codeword corresponds to a transport block.

11. The method of claim 1, wherein the transmission mode additionally specifies one or both of:

a transmission scheme switching between spatial diversity and multiplexing, and a scheduling scheme switching including frequency-selective scheduling and MU-MIMO.

12. The method of claim 1, wherein in the step of measuring the wireless channel, the signal transmitted from the transmitter is a signal whose characteristic at transmission is known beforehand at the receiver.

13. The method of claim 12, wherein the signal transmitted from the transmitter is one of:

a reference signal, a signal whose characteristic is known statistically, and a data signal whose characteristic is determined through an assistance provided through a decision feedback analyzer.

14. A receiver of a wireless network structured to perform a transmission mode adaption, the receiver comprising:

a channel measuring unit structured to measure a wireless channel based on a signal transmitted from a transmitter;

a SINR determining unit structured to determine one or more signal-to-interference-plus-noise ratios (SINRs) for each transmission mode of a plurality of transmission modes based on the wireless channel measurement;

a throughput determining unit structured to determine an aggregate throughput of each transmission mode based on the one or more SINRs of that transmission mode; and a mode selecting unit structured to:

determine whether there are multiple candidate transmission modes for transmission over the wireless channel, each candidate transmission mode having a same determined highest aggregate throughput among the plurality of transmission modes, and select a transmission mode for use by the transmitter from among the candidate transmission modes based on the one or more SINRs of the candidate transmission modes when it is determined that there are multiple candidate transmission modes, wherein each transmission mode specifies one or more parameters for a transmission from the transmitter to the receiver of one or more layers via one or more antennas at the transmitter, and specifies a mapping of codewords to layers.

15. The receiver of claim 14, wherein the SINR determining unit is structured to:

determine one or more SINR sets of each transmission mode based on the wireless channel measurements, each SINR set comprising one or more SINR values, wherein a number of SINR sets of that transmission mode is equal to a number of codewords to be transmitted in that transmission mode and wherein a number of SINR values in each SINR set is based on a mapping of layers to a codeword associated with that SINR set, and determine a set SINR value for each SINR set of that transmission mode based on the SINR values of that SINR set.

16. The receiver of claim 15, wherein the SINR determining unit is structured to:

determine an equivalent capacity value for each SINR value in that SINR set;

sum the equivalent capacity values; and determine the set SINR value of that SINR set based on the summed equivalent capacity values.

17. The receiver of claim 15, wherein the throughput determining unit is structured to select a modulation and coding scheme (MCS) for each SINR set of that transmission mode from an ordered group of MCSs based on the set SINR value of that SINR set, wherein each MCS specifies a required set value and the MCS selected for that SINR set is a highest MCS in the ordered group of MCSs whose required set value is met by the set SINR value of that SINR set, determine a set throughput of each SINR set based on the MCS selected for that SINR set, and sum the set throughputs of all SINR sets of that transmission mode to determine the aggregate throughput of that transmission mode.

18. The receiver of claim 15, wherein the mode selecting unit is structured to determine a backoff value for each candidate transmission mode, the backoff value being a largest value that can be backed off from the set SINR value of each SINR set of that candidate transmission mode and still maintain the same highest aggregate throughput, and select the candidate transmission mode having the highest backoff value among the candidate transmission modes.

19. The receiver of claim 15, wherein the mode selecting unit is structured to apply a common correction value to the set SINR values of each candidate transmission modes such that the corrected set SINR values lie in a range of the required values of the plurality of MCSs, and select the candidate transmission mode whose corrected set SINR sets map to the MCSs such that the aggregate throughput of the selected transmission mode is highest among the candidate transmission modes.

20. The receiver of claim 15, wherein the mode selecting unit is structured to determine a channel capacity of each candidate transmission mode based on the set SINR values of that candidate transmission mode, and select the candidate transmission mode having a highest channel capacity among the candidate transmission modes.

21. The receiver of claim 15, wherein the SINR determining unit is structured to determine a single effective SINR for each candidate transmission mode based on the set SINR values of that candidate transmission mode, and wherein the mode selecting unit is structured to select the candidate transmission mode whose single effective SINR is highest among the candidate transmission modes.

22. The receiver of claim 15, wherein the throughput determining unit is structured to determine a channel capacity of each transmission mode based on the set SINR values of that transmission mode, and wherein the mode selecting unit is structured to select the candidate transmission mode having a highest channel capacity among the plurality of transmission modes.

23. The receiver of claim 14, wherein each codeword corresponds to a transport block.

24. The receiver of claim 14, wherein the transmission mode additionally specifies one or both of:

a transmission scheme switching between spatial diversity and multiplexing, and a scheduling scheme switching including frequency-selective scheduling and MU-MIMO.

25. The receiver of claim 14, wherein the channel measuring unit is structured to measure the wireless channel based on the signal transmitted from the transmitter whose characteristic at transmission is known beforehand at the receiver.

26. The receiver of claim 25, wherein the signal transmitted from the transmitter is one of:

a reference signal, a signal whose characteristic is known statistically, and a data signal whose characteristic is determined through an assistance provided through a decision feedback analyzer.

27. A non-transitory computer readable medium storing therein computer executable instructions, the instructions, when executed, causing a computer to perform a method for transmission mode adaptation at or on behalf of a receiver of a wireless system, the method comprising:

measuring a wireless channel based on a signal transmitted from a transmitter;

determining one or more signal-to-interference-plus-noise ratios (SINRs) for each transmission mode of a plurality of transmission modes based on the wireless channel measurement;

determining an aggregate throughput of each transmission mode based on the one or more SINRs of that transmission mode;

determining whether there are multiple candidate transmission modes for a transmission over the wireless channel, each candidate transmission mode having a same determined highest aggregate throughput among the plurality of transmission modes; and selecting a transmission mode for use by the transmitter from among the candidate transmission modes based on the one or more SINRs of the candidate transmission modes when it is determined that there are multiple candidate transmission modes, wherein each transmission mode specifies one or more parameters for a transmission from the transmitter to the receiver of one or more layers via one or more antennas at the transmitter, and specifies a mapping of codewords to layers.

* * * * *